United States Patent [19]

Sword et al.

[11] Patent Number: 4,961,721
[45] Date of Patent: Oct. 9, 1990

[54] VEHICLE DRIVE LINES

[75] Inventors: John D. Sword, Oxon; Kenneth Pawson, Altringham, both of England

[73] Assignee: Massey-Ferguson Services N.V., Curacao, Netherlands

[21] Appl. No.: 327,193
[22] PCT Filed: Jul. 28, 1988
[86] PCT No.: PCT/GB88/00613
§ 371 Date: Mar. 13, 1989
§ 102(e) Date: Mar. 13, 1989
[87] PCT Pub. No.: WO89/01100
PCT Pub. Date: Feb. 9, 1989

[30] Foreign Application Priority Data

Jul. 29, 1987 [GB] United Kingdom ............... 8718027

[51] Int. Cl.[5] .............................................. F16H 47/06
[52] U.S. Cl. ..................................................... 475/47
[58] Field of Search ............... 74/674, 681, 687, 688, 74/720, 677, 679; 475/47, 51, 52

[56] References Cited

U.S. PATENT DOCUMENTS

| 2,704,468 | 3/1955 | Horton et al. | 74/688 |
|---|---|---|---|
| 3,400,609 | 9/1968 | Utter | 74/688 |
| 3,557,635 | 1/1971 | Tuck | 74/677 X |
| 4,289,044 | 9/1981 | Dorpmund et al. | 74/688 |
| 4,474,079 | 10/1984 | Crockett | 74/720 X |
| 4,483,212 | 11/1984 | Ohtsuka | 74/688 |
| 4,724,720 | 2/1988 | Ohkubo | 74/677 |

FOREIGN PATENT DOCUMENTS

| 208063 | 1/1987 | European Pat. Off. | 74/688 |
|---|---|---|---|
| 208840 | 1/1987 | European Pat. Off. | 74/688 |
| 493380 | 2/1976 | U.S.S.R. | 74/677 |

Primary Examiner—Dwight Diehl

[57] ABSTRACT

A vehicle in which a prime mover drives a drive shaft via a torque converter and a multi-ratio transmission and in which a drive line independent of the torque converter and multi-ratio transmission is also provided from the prime mover to the drive shaft. The independent drive line provides an overdrive or underdrive function to extend the drive ratio range provided by the multi-ratio transmission and includes a clutch for the engagement of the additional ratio or ratios, and an interlock arrangement to prevent the simultaneous connection of drive to the drive shaft via the multi-ratio transmission and the independent drive line. When an overdrive function is provided, for example the interlock arrangement prevents engagement of the overdrive ratio unless the multi-ratio transmission is operating in its highest ratio when engagement of the overdrive is selected.

6 Claims, 2 Drawing Sheets

VEHICLE DRIVE LINES

The present invention relates to a vehicle transmission particular to drive lines for use in industrial and agricultural tractors.

Tractors used in the construction industry have conventionally tended to use a relatively small number of ratios, four ratios is common, which are required to cope with the drive requirements of the tractor on the construction site and also provide a higher drive ratio for use in driving the tractor to the site on the road. As a result, it is not uncommon to find such tractors with a relatively low top road speed.

Also, such tractors often employ a torque converter to provide the drive connection between the prime mover and the multi-ratio transmission. Although the use of a torque converter provides advantages in the smooth take-up of drive, torque multiplication and slip during loader work, etc., it leads to inefficiency when the tractor, for example, encounters a steep incline when being driven to the construction site, since internal slip within the converter can lead to significant loss of road speed.

It is an object of the present invention to provide a vehicle which at least partially alleviates the above problems.

Thus, according to the present invention, there is provided a vehicle having a prime mover which drives a drive shaft via a torque converter and a multi-ratio transmission, the vehicle also including a drive line "transmission connected to the drive shaft" independent of the torque converter and multi-ratio transmission from the prime mover to the drive shaft, the independent drive line providing an overdrive or underdrive function to extend the drive ratio range provided by the multi-ratio transmission and including clutch means for the engagement of the additional ratio or ratios, and an interlock arrangement connected to the multi-ratio transmission to prevent the simultaneous connection of drive to the drive shaft via the multi-ratio transmission and the independent drive line.

By making the independent drive line fully mechanical, i.e. not involving the torque converter, the additional ratio or ratios can be selected to provide a higher road speed capability (say over 20 mph) without the possibility of torque converter slip. This also has the added advantage that the ratios provided by the multi-ratio transmission do not need to be comprised to the same degree by the consideration of providing an adequate road speed capability so that a better spread of ratios for site use is also obtained.

The interlock arrangement which prevents simultaneous engagement of drive to the drive shaft via the multi-ratio transmission and the independent drive line may also be arranged to prevent initiation of engagement of drive via the independent drive line unless the vehicle is operating in a predetermined transmission ratio when engagement is selected. For example, if the independent drive line is operating to provide a higher road speed ratio, (i.e. an overdrive capability) the interlock may be arranged to prevent initiation of engagement of drive via the independent drive line unless the transmission is operating in its highest ratio when engagement of overdrive is selected. Such an arrangement reduces the load on the clutch means in the independent drive line.

A further aspect of the present invention is the appreciation that a vehicle arrangement of the form described above can be achieved by converting a well-known vehicle drive configuration (hereinafter referred to as a vehicle of the type specified) in which a prime mover drives:

(a) a drive shaft via a torque converter and a multi-ratio transmission, and (b) a power take-off (PTO) shaft via an independent PTO drive line.

Thus, according to this further aspect of the present invention, there is provided a method of converting a vehicle of the type specified to provide an additional drive ratio comprising the steps of:

(1) providing a drive train between the PTO drive line and the drive shaft and give the required additional drive ratio at the drive shaft;

(2) providing a clutch means in the PTO drive line between the prime mover and the drive train to the drive shaft to enable engagement and disengagement of the additional drive ratio; and (3) providing an interlock arrangement connected to the multi-ratio transmission to prevent simultaneous connection of drive to the drive shaft via the multi-ratio transmission and the PTO drive line.

When a vehicle design is converted in the above manner the PTO shaft may be left in situ so that a PTO capability is still retained or it may be removed leaving the necessary portion of the PTO drive line to power the drive train.

Althoygh the above conversion may be carried out after manufacture of the vehicle using a retro-fit conversion kit, it is envisaged that the conversion will normally be built into the vehicle during its original manufacture so that the vehicle manufacturer will offer vehicles with and without the conversion.

One embodiment of the present invention, as applied to an industrial tractor drive line, will now be described by way of example only with reference to the accompanying drawings in which.

Figure 1:
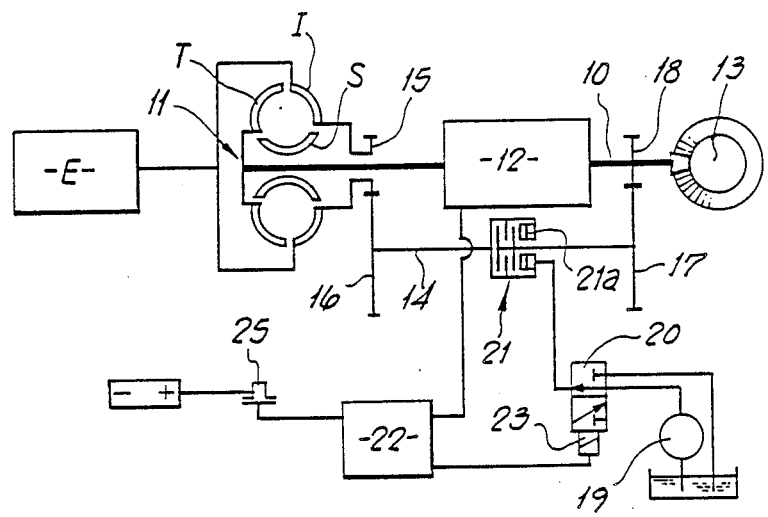
FIG. 1 is a diagrammatic representation of the drive line.

FIG. 1 shows an industrial tractor drive line arrangement in which the prime mover in the form of the diesel engine E drives the drive shaft 10 via a torque converter 11 and via a main multi-ratio transmission 12. Drive shaft 10 is connected to the rear axle of the tractor which is represented in FIG. 1 by the crown wheel and pinion assembly 13.

The torque converter 11 has the normal impellor, turbine and stator members denoted as I, T and S respectively in FIG. 1. An independent drive line 14 is driven from impellor I of the torque converter 11 via the gears 15 and 16 and is connected with the drive shaft 10 via gear train 17 and 18. The drive line 14 includes a clutch 21 to enable drive to the drive shaft 10 via drive line 14 to be engaged and disengaged. This clutch may be of the multi-plate, hydraulically operated type as shown in FIG. 1 in which hydraulic fluid under pressure is supplied from a pump 19 via a solenoid operated valve 20 to a piston and cylinder actuating assembly 21a of the clutch.

In a practical realization of the invention the gears 15 and 16, drive line 14, clutch 21 and gears train 17 and 18 may conveniently be included within the same housing as the main multi-ratio transmission 12. Alternatively, where the tractor is of the type in which its back axle is secured to the housing of transmission 12 to form part of its chassis the gear train 17 and 18 and part of drive line 14 may be located within the back axle.

An interlock arrangement designated 22 in FIG. 1 is also provided to prevent simultaneous engagement of drive to the drive shaft 10 via transmission 12 nd also via the drive line 14. If, as is often the case, the transmission 12 includes one or more multi-plate, hydraulically operated clutches controlled by a solenoid-operated valve or valves, the interlock arrangement may be achieved hydraulically by integrating the hydraulic circuits for the transmission clutches with the circuit for the drive line clutch 21 so that when hydraulic fluid is supplied to clutch 21 it cannot be supplied to the transmission clutches and vice versa. Alternatively, as shown in FIGS. 1 and 3, the interlock arrangement may be achieved electrically so that, for example, the simultaneous actuation of solenoid 23 of the valve 20 to engage the clutch 21 and solenoid controlling a clutch establishing a drive condiotion to the drive shaft 10 via the transmission 12 is not possible.

The primary purpose of drive line 14 is to provide an additional drive ratio for the tractor in order to enable the higher road speed to be obtained than can be provided by the main transmission 12 and/or a drive without torque converter slip. Thus drive line 14 is operating as an overdrive unit. It will be appreciated that the drive line could be set-up to operate as an underdrive unit.

When operating as an overdrive unit, in order to prevent undue loading on clutch 21, interlock arrangement 22 may include the additional interlock that initiation of the engagement of clutch 21 cannot take place unless the vehicle is operating in the highest ratio of transmission 12 when the engagement of the overdrive function is selected. Engagement of the overdrive facility is preferably initiated by a switch 25 which may be positioned on the vehicle dash-board or in some other convenient location, such as on the end of a gear selector lever.

Figure 3:
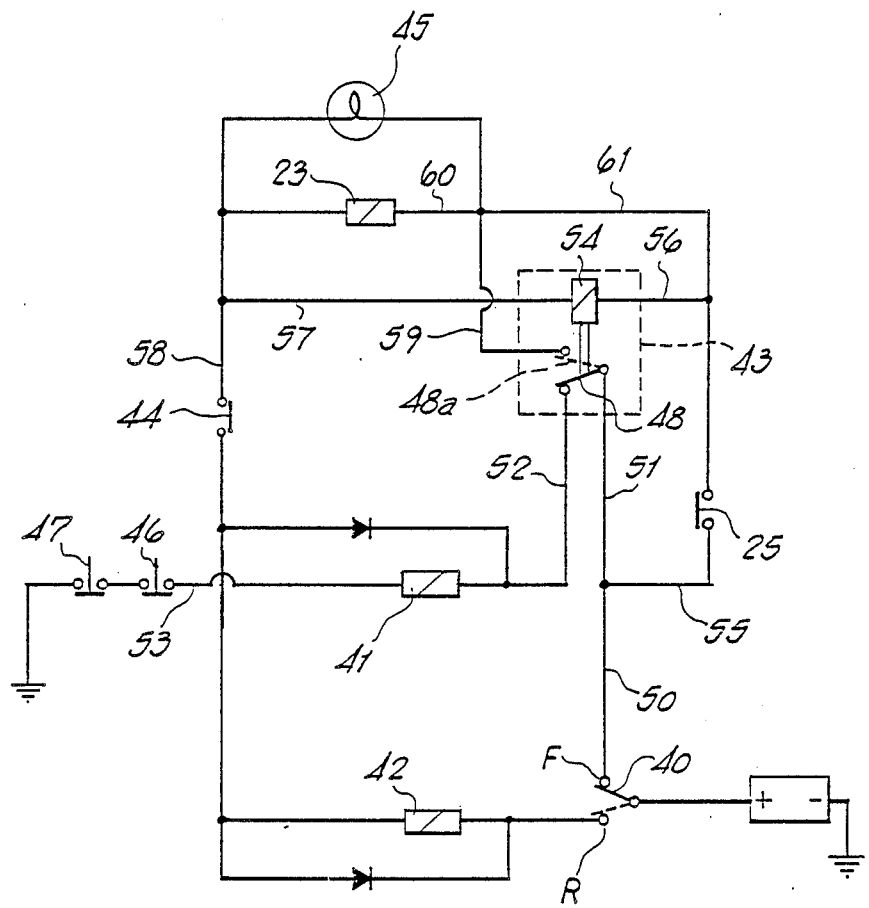
FIG. 3 is a diagrammatic representation of one form of suitable electrical control system for the drive line.

FIG. 3 shows diagrammatically one form of suitable electrical control circuit for transmission 12 and drive line 14 which includes an interlock which prevents engagement of an overdrive ratio unless the vehicle is being driven in the forward drive direction and the main transmission 12 is operating in its highest ratio. The control circuit of FIG. 3 is for use with a transmission 12 in which forward drive is engaged by a multiplate hydraulically operated clutch under the control of a valve controlled by a solenoid 41 and reverse drive is engaged by a second multi-plate hydraulically operated clutch under the control of a valve controlled by a solenoid 42. The operative ratio of transmission 12 is selected mechanically using mechanical couplers by a conventional gear selector lever. In the example described transmission 12 provides four ratios.

Referring to FIG. 3, forward and reverse drive is selected by a hand lever (not shown) which operates forward/reverse switch 40 which in turn operates either the forward solenoid 41 or reverse solenoid 42 depending on whether switch contact F or R is made.

The supply of power to the forward solenoid is via an interlock which includes a relay 43, a fourth gear sensing switch 44 and an indicator lamp 45. Switch 44 is arranged to be closed when the gear selector lever is moved into the fourth gear selection position of transmission 12 and to open under spring action when the selector lever leaves the fourth gear position. Overdrive selection switch 25, which is located on the dashboard, is arranged to be momentarily closed to select overdrive when pressed by the operator and to open under spring action when released.

Dump switches 46 and 47, which form part of the normal transmission control circuit, are also included in the forward and reverse drive clutch circuits. Dump switch 46 is mounted on the top of the gear selector lever of transmission 12 so that when the operator wishes to change the operative ratio in transmission 12 he depresses switch 46 to de-energise the operative forward or reverse solenoid 41, 42 to disconnect drive during movement of the selector lever. When switch 46 is released, the clutch solenoid 41 or 42 selected by switch 40 is again energised to re-establish drive. Thus switch 46 operates in a similar manner to a main clutch operating pedal to disengage drive during ratio changes.

Dump switch 47 is mounted on a front loader control lever so that when the machine is being operated as a loader the operator can disconnect drive to the transmission 12 by depressing switch 47 to de-energise solenoid 41 or 42 so that all avaialble power from the engine can temporarily be used to drive the hydraulic loader circuit whilst switch 47 is depressed.

If we assume that the vehicle is travelling in a forward direction in fourth gear, contact F of switch 40 will be made and switch 44 will be closed and relay contact 48 will be in fourth gear position shown in full lines in FIG. 3 so that the circuit to forward solenoid 41 is completed from swwitch 40 via lines 50, 51, 52 and 53.

If now the vehicle operator wishes to engage the fifth gear or overdrive function, he depresses switch 25 which momentarily energises the coil 54 of relay 43 via lines 55–58, 53 to move contact 48 to the fifth gear position 48a (shown in dotted detail in FIG. 3) so that the fifth gear solenoid 23 is energised from switch 40 via lines 50, 51, 59, 60, 58, 53 and the indicator lamp 45 is also lit. Contact 48 is held in position 48a after the release of switch 25 by the continued supply power to coil 54 via lines 50, 51, 59, 61, 56, 57, 58, 53. It will be noted that movement of contact 48 to position 48a breaks the circuit to solenoid 41 so that drive through the transmission 12 is automatically disconnected, thus preventing simultaneous engagement of drive via transmission 12 and drive line 14.

To disengage fifth gear the operator presses either of the dump buttons 46 or 47 (button 46 being the most likely since loader work is unlikely to involve the use of fifth gear). When button 46 or 47 is pressed, the circuit to the fifth gear solenoid is broken and contact 48 returns to the full line position of FIG. 3 in which solenoid 41 is again energised.

In an alternative arrangement switch 25 may be a toggle-action rocker switch which when pressed tp pivot and toggle in one direction momentarily completes line 55 and maintains a connection to the coil 54 via line 56 to actuate solenoid 23 and engage fifth gear, etc. and which when pressed to pivot and toggle in the other direction breaks line 56 to de-energise solenoid 23 and disengege fifth gear. Such as arrangement provides the operator with an additional means of disengaging fifth gear to dump switches 46 and 47. Also it enables the single switch 25 to control both the engagement and disengagement of fifth gear.

Thus the interlock arrangement shown in FIG. 3 prevents engagement of the overdrive ratio unless transmission 12 is operating in fourth gear when switch 25 is operated (since switch 44 must be closed to move contact 48 to the fifth gear position 48a); it also prevents simultaneous engagement of drive via transmission 12 and drive line 14 (since solenoids 41 and 42 are de-energised when contact 48 is in position 48a), and prevents engagement of overdrive unless the forward drive direction has been selected (since the overdrive solenoid 23 can only be energised via the forward drive contact F of the direction selector lever).

Figure 2:
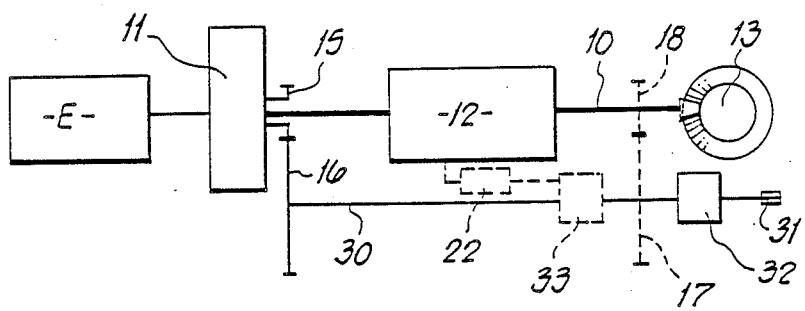
FIG. 2 shows diagrammatically how the drive line can be obtained by converting a well-known vehicle drive configuration with an independent PTO.

An important aspect of the present invention is the realization that a vehicle drive arrangement of the form described above can be obtained by converting a vehicle drive configuration of the form shown in full lines in FIG. 2 and herein referred to as a "vehicle of the type specified". Those components shown in FIG. 2 which are of the same form or function as components previously described with reference to FIG. 1 have been similarly numbered.

Thus referring to FIG. 2, in such a vehicle of the type specified, a prime mover E drives the drive shaft 10 via a torque converter 11 and a main multi-ratio transmission 12. A power take-off (PTO) drive line 30 is provided in which a PTO shaft 31 is driven from the torque converter casing via gears 15 and 16. The PTO drive line 30 also includes a clutch 32 for disengagement of the drive to the PTO shaft 31 which, as will be appreciated from the above, is directly driven from the prime mover E without the inclusion of the torque converter in the PTO shaft drive line.

A Vehicle of the type specified, as described above with reference to FIG. 2, can be converted in accordance with the present invention by taking the following steps, (1) providing a drive train between the PTO shaft 30 and the drive shaft 10 using gears 17 and 18 whose ratio is selected to give the desired additional drive ratio at the drive shaft;

(2) providing a clutch 33 on the prime mover side of gear train 17, 18 (this may be achieved by repositioning clutch 32 or providing an additional clutch 33 if it is desired to retain the power take-off shaft capability), and (3) providing an interlock arrangement 22 to prevent simultaneous connection of drive to the drive shaft 10 via the PTO drive line 30 and also via the transmission 12.

As will be appreciated from the above, the present invention provides, in a tractor with a power take-off drive line, a simple and very efficient arrangement for providing an overdrive function which significantly improves the operating efficiency of an industrial tractor by reducing the travel times when the tractor is driven from site to site without incurring the cost of a new transmission. Also, since the independent drive line does not include the torque converter, the arrangement is made even more efficient since torque converter slip is eliminated.

The invention is applicable to tractors in which a front axle support, engine block, torque converter casing, transmission housing and back axle are all secured together to form a rigid chassis and also to tractors in which a separate chassis or frame is provided which carries at least some of the above components and in which, for example, all drive from the transmission housing is connected to a sepaprate back axle via external drive shaft.

We claim:

1. A vehicle having a prime mover (E) which drives a drive shaft (10) via a torque converter (11) and a multi-ratio transmission (12), the vehicle also including an independent drive line (14) connected between the prime mover and the drive shaft (10) independent of the action of the torque converter and multi-ratio transmission (12), the independent drive line (14) providing an overdrive or underdrive function to extend the drive range provided by the multi-ratio transmission and including clutch means (21) for the engagement of the additional ratio, and an interlock arrangement (22) connected to the multi-ratio transmission (12) to prevent the simultaneous connection of drive to the drive shaft via the multi-ratio transmission (12) and the independent drive line (14).

2. A vehicle according to claim 1 in which the interlock arrangement (22) also prevents initiation of engagement of drive via the independent drive line (14) unless the vehicle is operating in a predetermined transmission ratio when engagement is selected.

3. A vehicle according to claim 2 in which the independent drive line (14) provides an overdrive function and the interlock arrangement (22) prevents engagement of the overdrive ratio unless the transmission is operating in its highest ratio when engagement of the overdrive is selected.

4. A vehicle according to claim 1 in which ratio selections in the multi-ratio transmission (12) are achieved by hydraulically operated clutches and an hydraulically operated clutch (21) is also used in the independent drive line (14), the interlock arrangement (22) being achieved hydraulically by ensuring that when pressurised hydraulic fluid is supplied to the transmission clutches it is not supplied to the independent drive line clutch and vice versa.

5. A vehicle according to claim 1 in which ratio selections in the multi-ratio transmission (12) are achieved by clutches controlled by one ore more solenoid-operated (41,42) fluid control valves and the clutch in the independent drive line is also controlled by a solenoid-operated fluid flow control valve (20,23), the interlock arrangement being achieved electrically by ensuring that simultaneous actuation of the independent drive line solenoid-operated valve and the one or more of the multi-ratio transmission solenoid-operated valves is not possible.

6. A method of providing an additional drive ratio in a vehicle in which a prime mover drives.

(a) a drive shaft via a torque converter and a multi-ratio transmission, and (b) a power take-off (PTO) shaft via an independent PTO drive line, the method being characterised by comprising the steps of:

(1) providing a drive train between the PTO drive line and the drive shaft to give the required additional drive ratio at the drive shaft;

(2) providing a clutch means in the PTO drive line between the prime mover and the train to the drive shaft to enable engagement and disengagement of the additional drive ratio, and (3) providing an interlock arrangement connected to the multi-ratio transmission to prevent simultaneous connection of drive to the drive shaft via the multi-ratio transmission and the PTO drive line.

* * * * *